US012783250B2

(12) United States Patent
Shanmugam

(10) Patent No.: US 12,783,250 B2
(45) Date of Patent: Nov. 3, 2026

(54) BOOT AI INFERENCING SYSTEM

(71) Applicant: Dell Products L.P., Round Rock, TX (US)

(72) Inventor: Murali Manohar Shanmugam, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 95 days.

(21) Appl. No.: 18/935,734

(22) Filed: Nov. 4, 2024

(65) Prior Publication Data

US 2026/0127004 A1 May 7, 2026

(51) Int. Cl.
*G06F 9/4401* (2018.01)

(52) U.S. Cl.
CPC .................................. *G06F 9/4401* (2013.01)

(58) Field of Classification Search
None
See application file for complete search history.

(56) References Cited

U.S. PATENT DOCUMENTS

2019/0236280 A1* 8/2019 Sheng ................... G06F 9/4401
2020/0319893 A1* 10/2020 Wilkinson ............ G06F 9/4403
2023/0205885 A1* 6/2023 Chen ..................... G06F 9/4401 713/2
2025/0355673 A1* 11/2025 Tzeng ................. G06F 16/3329
2026/0023421 A1* 1/2026 Chang ................... G06F 1/3203
2026/0023573 A1* 1/2026 Chang ................... G06F 1/3203

OTHER PUBLICATIONS

Angela Wang, "Parallelizing across multiple CPU/GPUs to speed up deep learning inference at the edge," in AWS IoT Greengrass, Internet of Things, AWS Machine Learning Blog, Aug. 20, 2019, 12 pages. https://aws.amazon.com/blogs/machine-learning/parallelizing-across-multiple-cpu-gpus-to-speed-up-deep-learning-inference-at-the-edge/.

* cited by examiner

*Primary Examiner* — Fahmida Rahman
(74) *Attorney, Agent, or Firm* — Joseph Mencher

(57) ABSTRACT

A boot Artificial Intelligence (AI) inferencing system includes a computing device. A processing system in the computing device includes a plurality of processor cores. A first processor core in the plurality of processor cores provides a Basic Input/Output System (BIOS) that, during initialization of the computing device, uses the plurality of processor cores operating in parallel to provide an Artificial Intelligence (AI) inference engine, and enables at least one AI instruction set extension for use by the AI inference engine. When the BIOS receives an AI inferencing request from an application to perform AI inferencing, it uses the AI inference engine to perform the AI inferencing request.

20 Claims, 9 Drawing Sheets

BOOT AI INFERENCING SYSTEM

BACKGROUND

The present disclosure relates generally to information handling systems, and more particularly to providing Artificial Intelligence (AI) inferencing during the boot of an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As discussed in detail below, the inventors of the present disclosure have recognized that AI inferencing functionality would be beneficial in Basic Input/Output System (BIOS) and Unified Extensible Firmware Interface (UEFI) environments provided during the boot and/or other initialization of information handling systems such as server devices, networking devices, storage systems, and/or other computing devices known in the art. However, AI training and AI inferencing is typically performed using Graphics Processing Units (GPUs), which are relatively expensive and more and more often subject to limited availability. Furthermore, UEFI protocols for the boot of computing devices utilize a single core/thread provided by a single "Boot Strap Processor" (BSP) core in the processing system, and one of skill in the art would recognize that the time needed to perform AI inferencing using a single core in a processing system would exceed most (if not all) latency thresholds. Further still, conventional UEFI systems do not support AI inference instruction set extensions that are used with AI inferencing.

Accordingly, it would be desirable to provide a boot AI inferencing system that addresses the issues discussed above.

SUMMARY

According to one embodiment, an Information Handling System (IHS) includes a processing system including a plurality of processor cores; and a memory system that is coupled to the processing system and that includes instructions that, when executed by a first processor core in the plurality of processor cores included in the processing system, cause the first processor core to provide a Basic Input/Output System (BIOS) that is configured, during initialization of the IHS, to: provide, using the plurality of processor cores operating in parallel, an Artificial Intelligence (AI) inference engine; enable at least one AI instruction set extension for use by the AI inference engine; receive, from an application, an AI inferencing request to perform AI inferencing; and perform, using the AI inference engine, the AI inferencing request.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
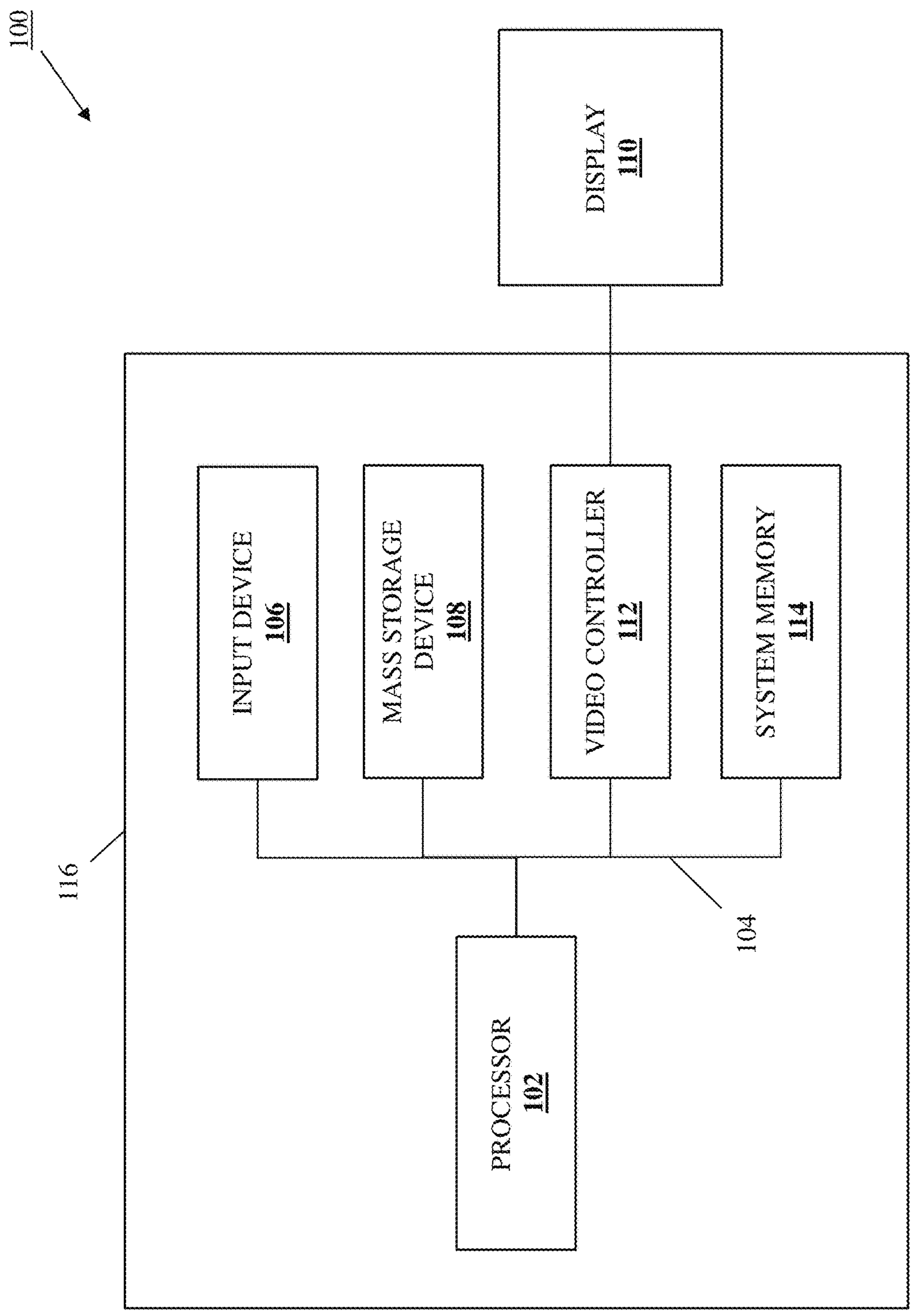
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
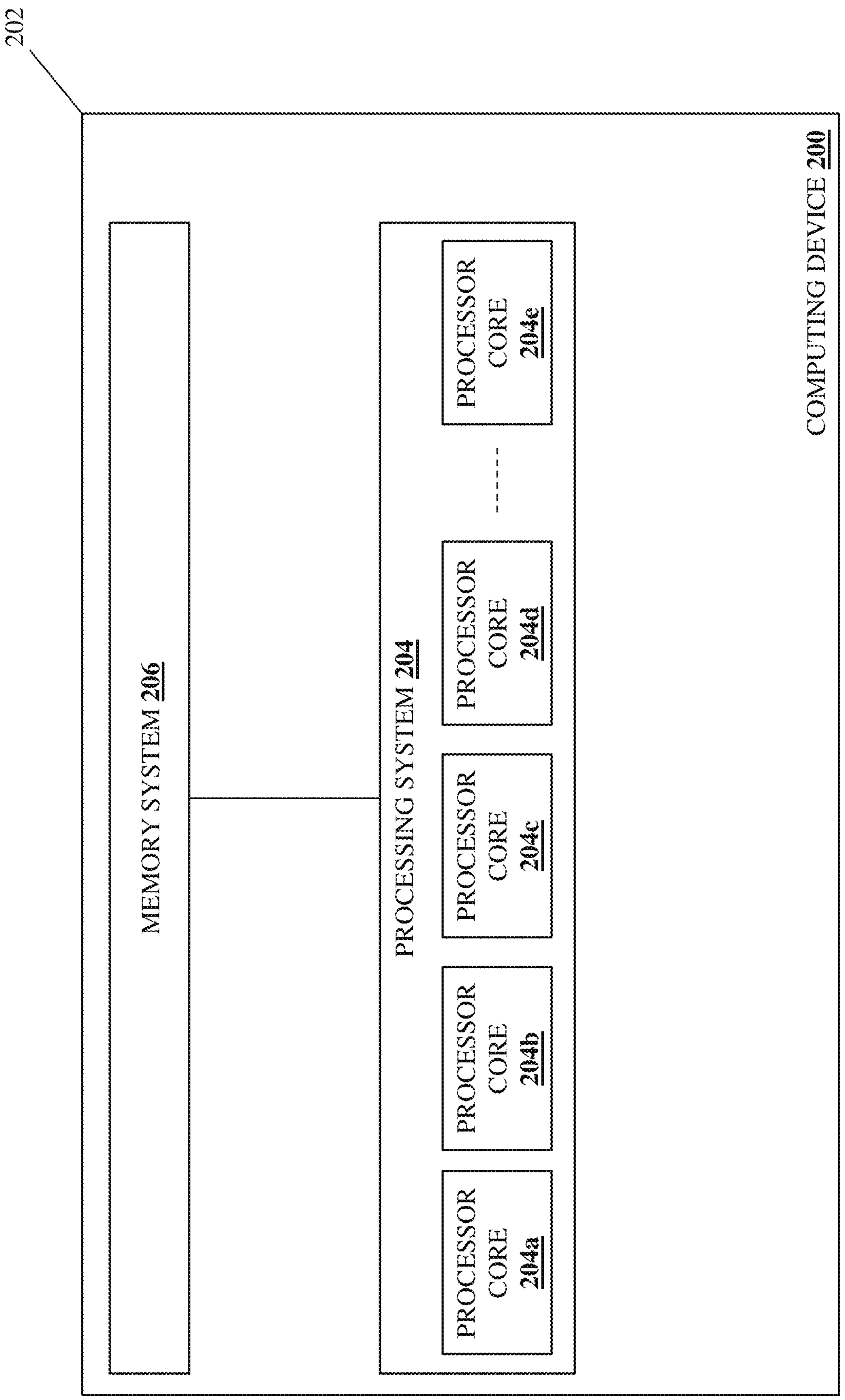
FIG. 2 is a schematic view illustrating an embodiment of a computing device that may provide the boot AI inferencing system of the present disclosure.

Referring now to FIG. 2, an embodiment of a computing device 200 is illustrated that may provide the boot AI inferencing system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and described below. For example, the chassis 202 may house a processing system 204 (e.g., which may include the processor 102 discussed above with reference to FIG. 1 such as, for example, a Central Processing Unit (CPU) and/or other processing systems known in the art) that includes a plurality of processing cores 204*a*, 204*b*, 204*c*, 204*d*, and up to 204*e*. As will be appreciated by one of skill in the art in possession of the present disclosure, the processing system 204 may include over 100 processor cores (e.g., the "Sierra Forrest" server processor available from INTEL® Corporation of Santa Clara, California, United States includes 128 processor cores), and thus how any number of processor cores will fall within the scope of the present disclosure.

The chassis 202 also houses a memory system 206 (e.g., which may include the memory 114 discussed above with reference to FIG. 1 such as, for example, Basic Input/Output System (BIOS) firmware-based memory, a main memory subsystem provided by Dynamic Random Access Memory (DRAM), etc.) that is coupled to the processing system 204 and that, as discussed below, may include Basic Input/Output System (BIOS) instructions that, when executed by the processor core 204*a* in the processing system 204, cause processor core 204*a* to provide a BIOS that is configured to perform the functionality of the BIOS discussed below, and may include AI inference instructions that, when executed by the processor cores 204*a*-204*e* in the processing system 204, cause processor cores 204*a*-204*e* to provide an AI inference engine that is configured to perform the functionality of the AI inference engines discussed below. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the boot AI inferencing functionality discussed below, while remaining within the scope of the present disclosure as well.

Figure 3:
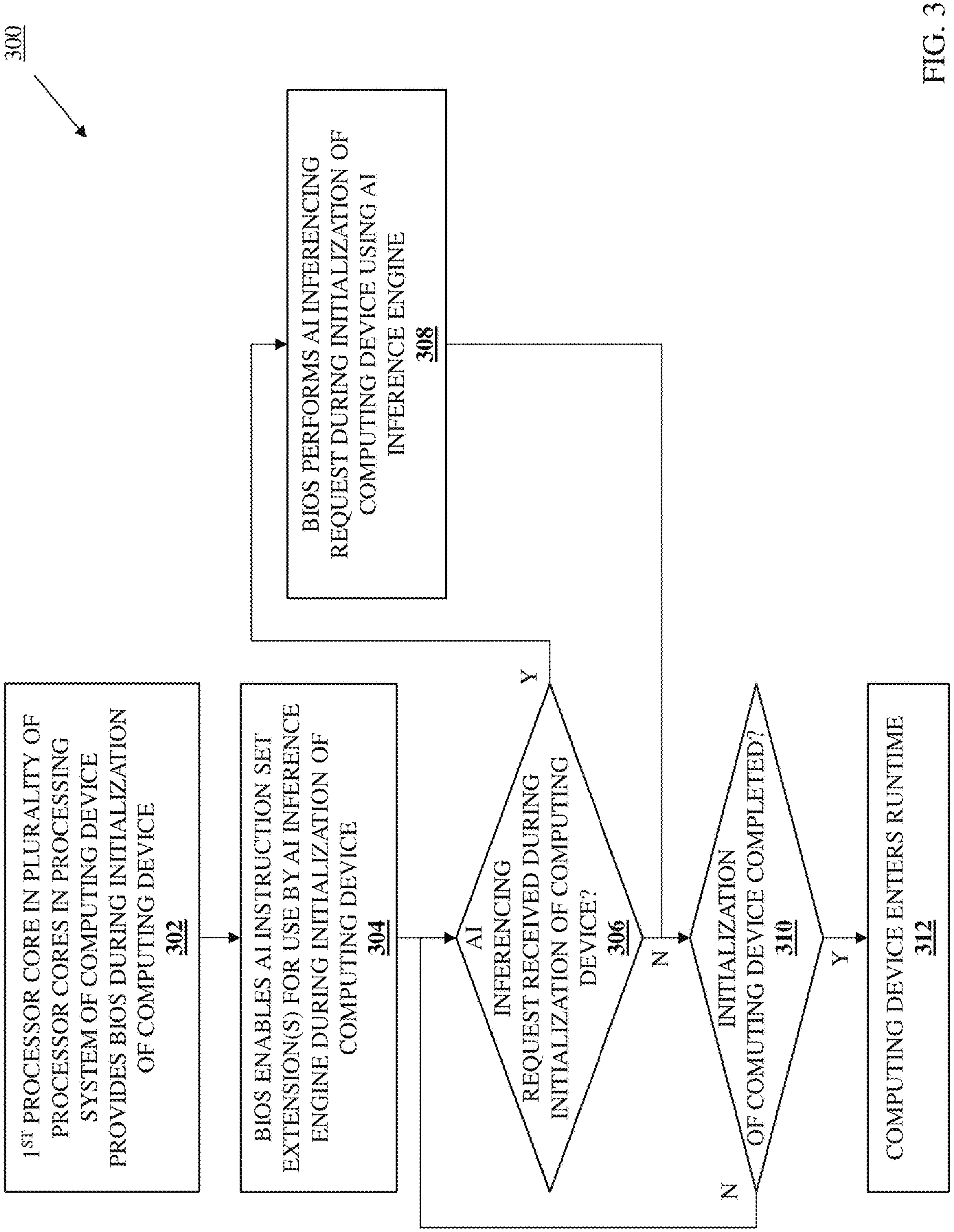
FIG. 3 is a flow chart illustrating an embodiment of a method for performing Artificial Intelligence (AI) inferencing during boot of a computing device.
Figure 4:
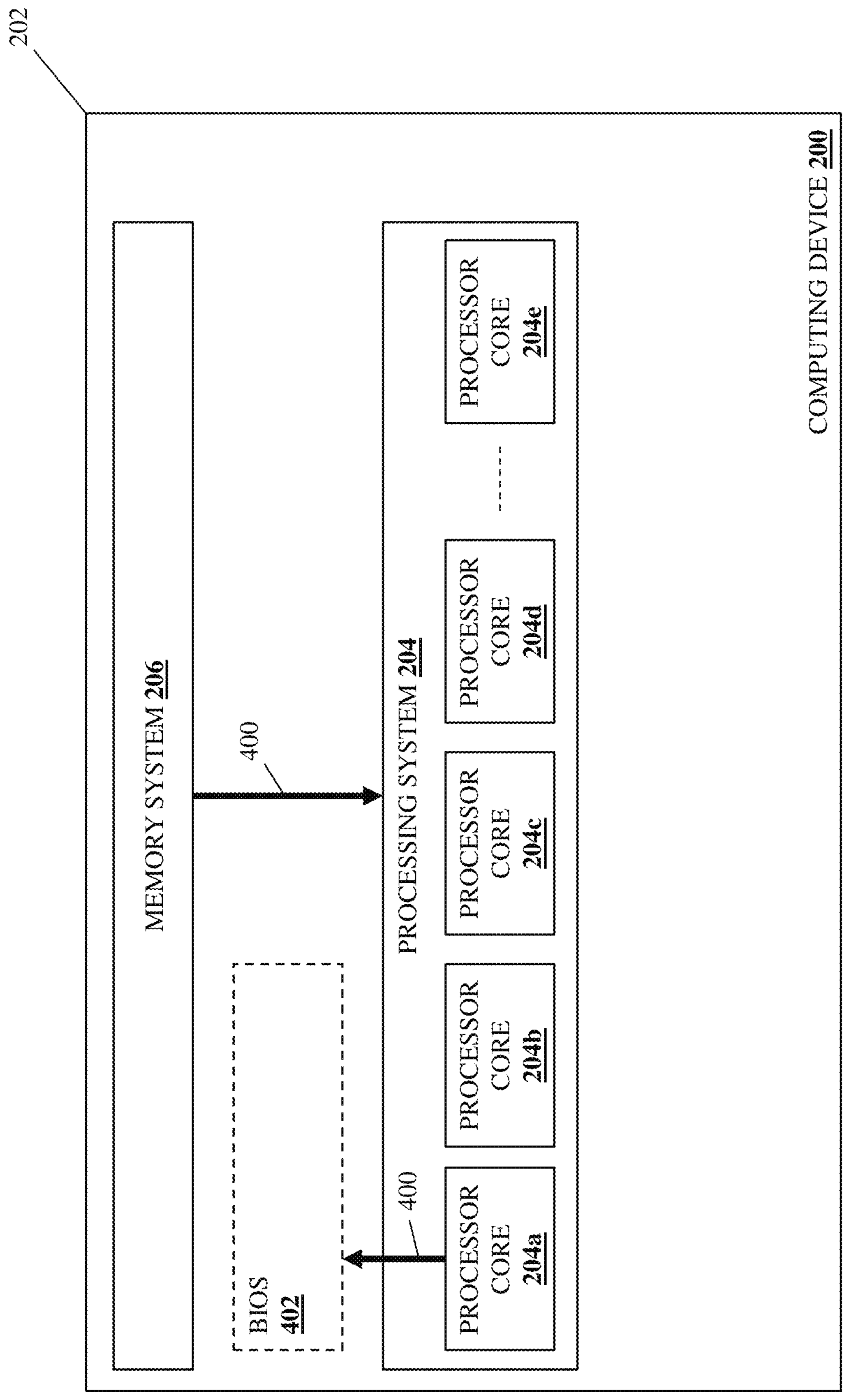
FIG. 4 is a schematic view illustrating an embodiment of the computing device of FIG. 2 operating during the method of FIG. 3.

Referring now to FIG. 3, an embodiment of a method 300 for performing Artificial Intelligence (AI) inferencing during boot of a computing device is illustrated. As discussed below, the systems and methods of the present disclosure operate a plurality of processor cores in a processing system of a computing devices in parallel to provide an AI inferencing engine during boot of the computing device, and enable AI instruction set extension(s) during boot of the computing device for use by the AI inferencing engine. For example, the boot AI inferencing system may include a computing device. A processing system in the computing device includes a plurality of processor cores. A first processor core in the plurality of processor cores provides a Basic Input/Output System (BIOS) that, during initialization of the computing device, uses the plurality of processor cores operating in parallel to provide an Artificial Intelligence (AI) inference engine, and enables at least one AI instruction set extension for use by the AI inference engine. When the BIOS receives an AI inferencing request from an application to perform AI inferencing, it uses the AI inference engine to perform the AI inferencing request. As discussed below, such AI inferencing may be utilized by UEFI shell applications, BIOS-embedded applications, and/or other boot applications that perform configuration, device/workload optimization, diagnostics, error handling, and/or other functionality during the boot of the computing device.

The method 300 begins at block 302 where a first processor core in a processing system of a computing device provides a BIOS during initialization of the computing device. In an embodiment, at block 302, the computing device 200 may be powered on, reset, booted, rebooted, and/or otherwise initialized such that the computing device 200 begins initialization (e.g. Power-On Start-Up (POST) operations), and the processor core 204*a* may perform BIOS provisioning operations 400 that include using BIOS instructions stored in the memory system 206 to provide a BIOS 402 for the computing device 200. For example, the processor core 204*a* (e.g. a "first" core of a CPU that provides the processing system 204) may be designated the "Boot Strap Processor" (BSP) for the computing device 200, and one of skill in the art in possession of the present disclosure will appreciate how conventional processing systems in conventional computing devices use only the BSP to provide the conventional BIOS (i.e. the BSP completes the conventional initialization of its conventional computing device such that that conventional computing device enters runtime, after which an operating system takes over control of that conventional computing device and the other processor cores 204*b*-204*e* (called Application Processors (APs)) may operate to provide applications and other functionality).

As will be appreciated by one of skill in the art in possession of the present disclosure, the BIOS 402 may then operate to perform hardware initialization and/or other boot operations during the initialization of the computing device 200 in order to configure the computing device 200 with an operating system such that the computing device 200 may enter runtime and the operating system may take over control of the computing device 200. For example, the BIOS 402 may be configured to perform a SECurity (SEC) phase immediately after the computing device 200 is powered on to provide relatively minimal hardware initialization, set up a temporary memory environment, and/or perform other SEC phase initialization operations known in the art. Following the SEC phase, the BIOS 402 may be configured to perform a Pre-Extensible Firmware Interface (EFI) Initialization (PEI) phase to initialize the main memory subsystem, discover a firmware volume, prepare the computing device 200 for the next phase of initialization by creating Hand-Off Blocks (HOBs) that provide data structures for passing information between different initialization phases, and/or perform other PEI phase initialization operations known in the art.

Following the PEI phase, the BIOS 402 may be configured to perform a Driver eXecution Environment (DXE) phase to load and execute DXE drivers that initialize the processing system 204, chipset, and other components in the computing device 200; use a DXE "Foundation" that is configured to provide boot services, runtime services, and DXE services; use a DXE "Dispatcher" to discover and execute the DXE drivers in correct order; and/or perform other DXE phase initialization operations known in the art. Following the DXE phase, the BIOS 402 may be configured to perform a Boot Device Selection (BDS) phase to implement a computing device boot policy that includes selecting boot devices and loading an operating system, establish consoles and attempt to boot the operating system, and/or perform other BDS phase initialization operations known in the art.

Following the BDS phase in which the operating system has been successfully loaded, the initialization of the computing device 200 completes, and the BIOS 402 may be configured to perform a RunTime (RT) phase to perform runtime services that the operating system may use while it is running, perform "afterlife" operations that include system shutdown, reboot, and/or other actions that occur after the operating system has taken control of the computing device 200, and/or perform other RT phase runtime operations known in the art. However, while a specific initialization process performed by the BIOS 402 for the computing device 200 has been described, one of skill in the art in possession of the present disclosure will appreciate that the boot AI inferencing system may be provided during other initialization processes while remaining within the scope of the present disclosure as well.

Figure 5:
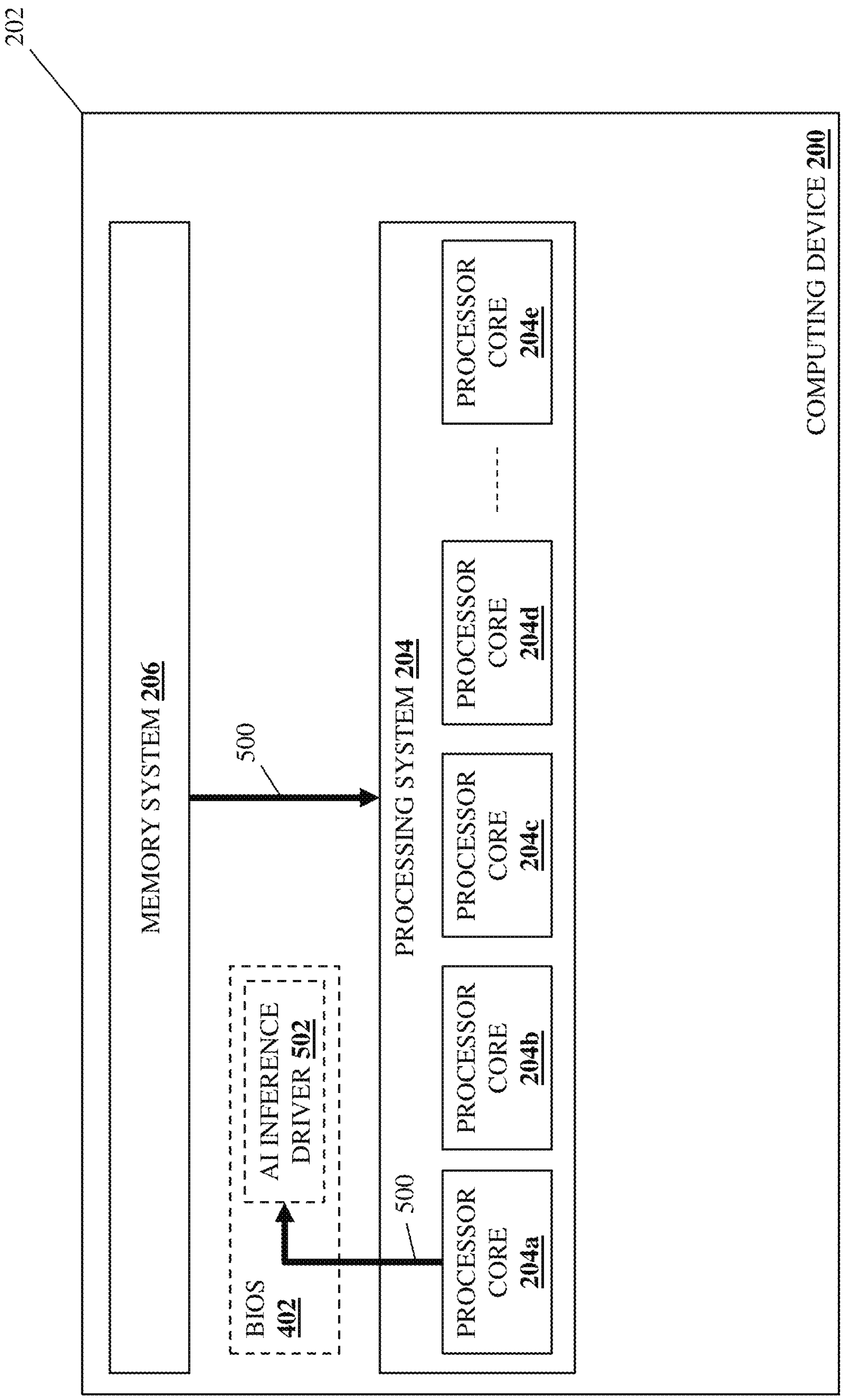
FIG. 5 is a schematic view illustrating an embodiment of the computing device of FIG. 2 operating during the method of FIG. 3.

With reference to FIG. 5, at block 302 and during the initialization of the computing device 200, the processor core 204*a* may perform interference driver provisioning operations 500 that include using inference driver instructions stored in the memory system 206 to provide an AI inference driver in the BIOS 402. For example, during the performance (or following the completion) of the DXE phase of the initialization/boot of the computing device 200 described above that configures the components of the computing device 200 red to provide the functionality described below, the BIOS 402 may "load" the AI inference driver 502. To provide a specific example, the BIOS 402 may load the AI inference driver 502 during (e.g. at or near the end of) the DXE phase of the initialization/boot of that server device, although the loading of the AI inference driver 502 at other points in the initialization/boot process will fall within the scope of the present disclosure as well.

In some specific examples, at block 302 the AI inference driver 502 may then leverage the "MP" services protocol available in the TianoCore EDK II open-source library in order to check whether all of the processor cores 204*a*-204*e* are functioning properly during the initialization/boot of the computing device 200, and may enable an AI inference protocol that, as discussed below, may be utilized by the UEFI shell applications, BIOS-embedded applications, and/or other boot applications discussed below in order to utilize the processor cores 204*a*-204*e* to perform AI inference operations during the initialization/boot of the computing device 200 (i.e., an AI inference protocol that enables execution of instructions in parallel by the processor cores 204*a*-204*e* that include the BSP that is conventionally available for processing during initialization/boot of conventional computing devices, and the APs that are conventionally unavailable for processing during initialization/boot of conventional computing devices). However, while a specific example has been provided, one of skill in the art in possession of the present disclosure will appreciate that the computing device may be configured to enable the AI inference functionality discussed below in other manners while remaining within the scope of the present disclosure as well.

The method 300 then proceeds to block 304 where the BIOS enables at least one AI instruction set extension for use by the AI inference engine during the initialization of the computing device. In an embodiment, at block 304, the inference driver 502 in the BIOS 402 may enable AI instruction set extension(s) such as the Advanced Matric eXtensions (AMXs) provided by INTEL® corporation of Santa Clara, California, United States; future AI instruction set extensions such as those that are expected to be available from ADVANCED MICRO DEVICES (AMD®) Inc. of Santa Clara, California, United States; and/or other AI instruction set extensions that would be apparent to one of skill in the art in possession of the present disclosure. In a specific example, the enabling of the AI instruction set extensions at block 304 may include the enabling of AI instruction set extension accelerators included in each of the processor cores 204*a*-204*e* (e.g., AMX accelerators in processor cores of CPUs such as the "Sapphire Rapids" CPUs, "Emerald Rapids" CPUs, and/or other CPUs provided by INTEL® corporation of Santa Clara, California, United States).

As will be appreciated by one of skill in the art in possession of the present disclosure and as described below, the AI instruction set extensions may be called by the UEFI shell applications, BIOS-embedded applications, and/or other boot applications discussed below in order to use the AI instruction set extension accelerators included in each of the processor cores 204*a*-204*e* to perform AI inference operations. To provide a specific example using the AMXs discussed above, the AI inference driver 502 may provide a "wrapper" for a library of functions that utilize AMX x86 instruction set extensions that are optimized for AI workload execution in CPUs, with each function in the AI inference driver 502 configured to be called by the UEFI shell applications, BIOS-embedded applications, and/or other boot applications discussed below in order to execute a corresponding instruction set in the AI inference driver 502 using the AMX accelerators in the processor cores 204*a*-204*e* (i.e., rather than having to code those functions/instruction sets in those boot applications). As will be appreciated by one of skill in the art in possession of the present disclosure, the AI instruction set extensions described herein operate to optimize CPU AI workload execution, with the specific example of the AMXs providing particular value for CPU-executed AI applications (i.e., INTEL® corporation of Santa Clara, California, United States advertises 10× performance improvements when performing workloads via processor cores using the AMXs).

Figure 6:
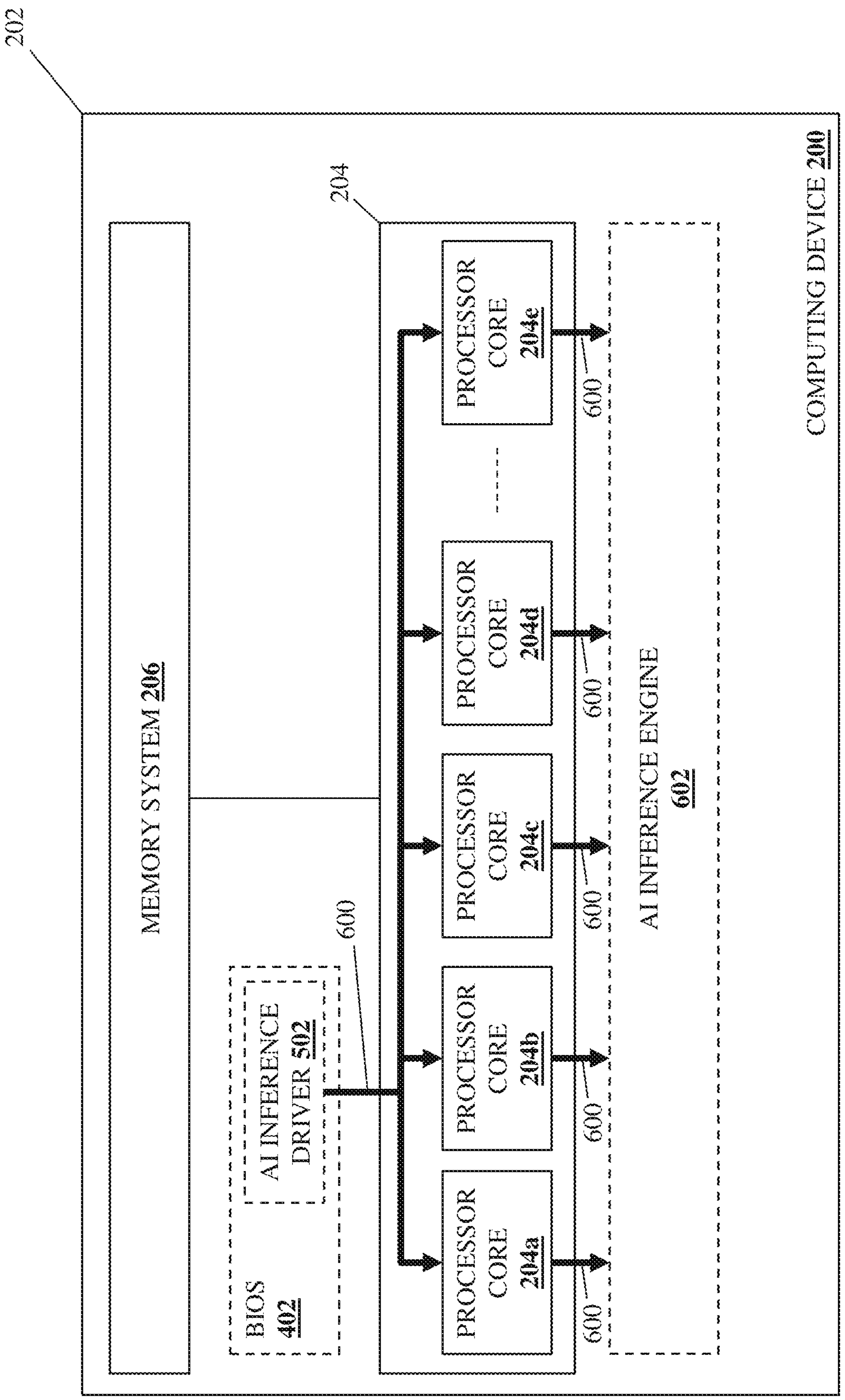
FIG. 6 is a schematic view illustrating an embodiment of the computing device of FIG. 2 operating during the method of FIG. 3.

The method 300 then proceeds to decision block 306 where the method 300 proceeds depending on whether an AI inferencing request is received during the initialization of the computing device. With reference to FIG. 6, in an embodiment of decision block 306, the AI inference driver 502 in the BIOS 402 may perform AI inference engine provisioning operations 600 that include providing an AI inference engine 602 using the processor cores 204*a*-204*e* operating in parallel. For example, following the DXE phase of the initialization/boot of the computing device 200 and during the BDS phase of the initialization/boot of the computing device 200 discussed above (i.e., once the components of the computing device 200 have been configured in a manner that enables the performance of the AI inference operations described below, and in some examples once a UEFI shell is available), the AI inference driver 502 may provide the AI inference engine 602 using the processor cores 204*a*-204*e* operating in parallel, and while the example provided below illustrates and describe the AI inference engine 602 being provided prior to receiving an AI inferencing request, one of skill in the art in possession of the present disclosure will appreciate how the BIOS 402 may be configured to receive AI inferencing requests and the AI inference driver 502 may provide the AI inference engine 602 in response to the BIOS 402 receiving those AI inferencing requests while remaining within the scope of the present disclosure as well.

As will be appreciated by one of skill in the art in possession of the present disclosure, the AI inferencing engine 602 may have previously been configured by training an AI model using data collection techniques (e.g., compiling a relatively large training dataset for the task the AI inferencing engine 602 will perform), data preprocessing techniques (e.g., preprocessing the training dataset for use in training), model selection techniques (e.g., selecting a training model that is appropriate for the task the AI inferencing engine 602 will perform), training techniques (e.g., providing the preprocessed training data into the training model, adjusting the parameters of the training model to minimize errors between training model predictions and actual labels), validation techniques (e.g., using a validation dataset to tune hyperparameters and prevent overfitting), and evaluation techniques (e.g., testing the training model on a test dataset to evaluate its performance.

Furthermore, one of skill in the art in possession of the present disclosure will appreciate how, once the AI model has been trained, it may be deployed as the AI inferencing engine 602 that, as discussed below, may be configured to access new data, process the new data using patterns and relationships learned during the AI training to make predictions or classifications, and output those predictions or classifications, while allowing its performance to be monitored and updated as needed (e.g., via retraining using the new data to maintain accuracy and relevance). However while a specific example of the configuration of the AI inferencing engine 602 has been described, one of skill in the art in possession of the present disclosure will appreciate that AI inferencing engines may be configured in other manners that will fall within the scope of the present disclosure as well.

Figure 7:
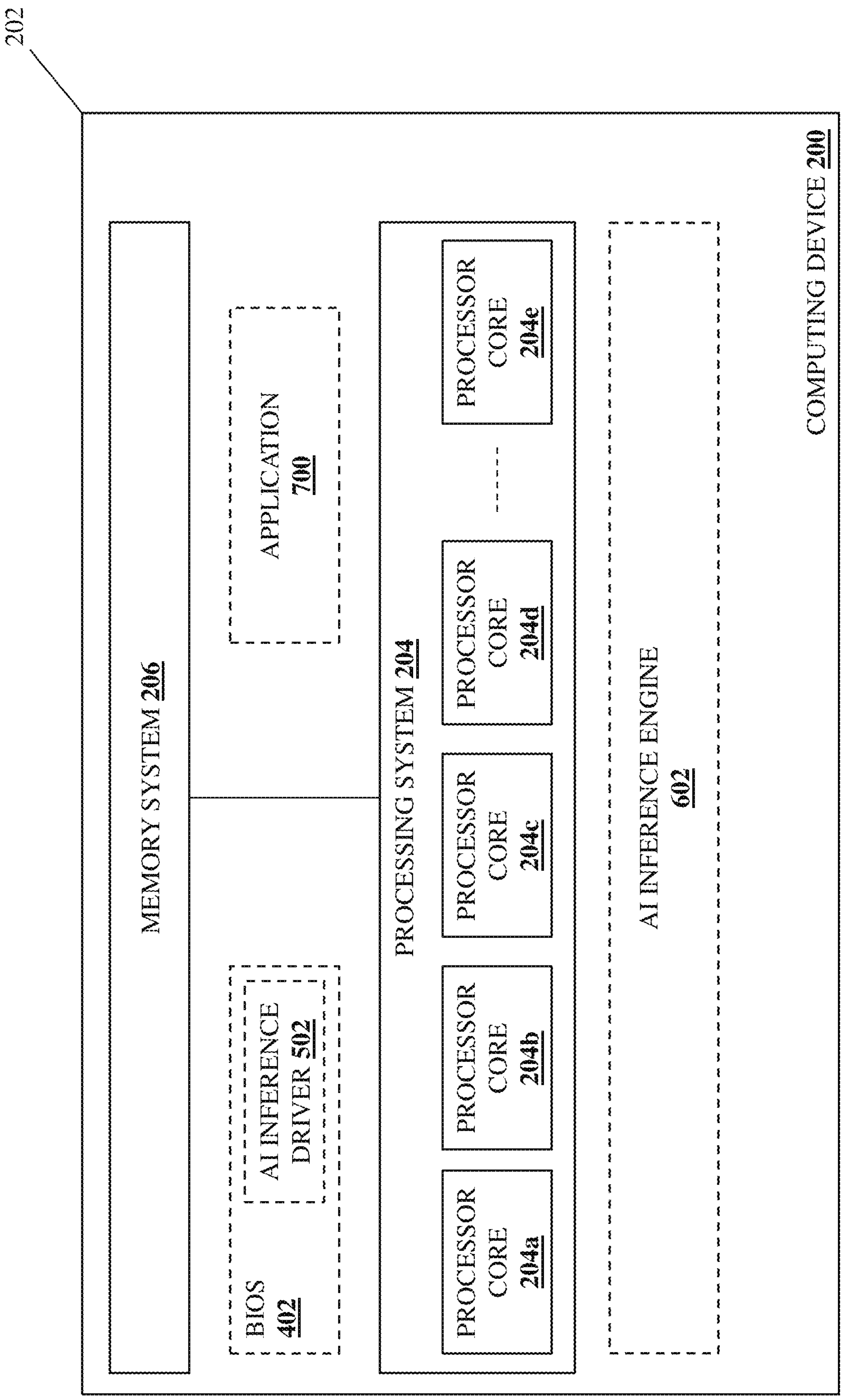
FIG. 7 is a schematic view illustrating an embodiment of the computing device of FIG. 2 operating during the method of FIG. 3.

Furthermore, with reference to FIG. 7, at decision block 306 and during the initialization of the computing device 200, an application 700 may be provided. As described above, in some embodiments the application 700 may be provided by a UEFI shell application that is separate from the BIOS 402, while in other embodiments the application 700 may be provided by a BIOS-embedded application that is embedded in the BIOS 402 and "hidden" by being integrated into the initialization/boot flow for the computing device 200 (i.e. those BIOS-embedded applications may be configured to run during each boot/initialization of the computing device 200). As such while one of skill in the art in possession of the present disclosure will recognize that the application 700 is illustrated as being provided by a UEFI shell application that is separate from the BIOS 402, the application 700 illustrated and describe below may represent a BIOS-embedded application that is embedded in the BIOS 402 and that functions similarly to the application 700 discussed below while remaining within the scope of the present disclosure as well.

As will be appreciated by one of skill in the art in possession of the present disclosure, the boot AI inferencing system of the present disclosure allows UEFI shell applications, BIOS-embedded applications, and/or other boot applications to be developed using relatively "light-weight" open-source application development tools such as the "LLaMa.cpp" application development tool, the "Mistral" application development tool available from MISTRAL AI® of Paris, France, and/or other application development tools known in the art that have not conventionally be used to develop applications that are used during the boot/initialization of conventional computing devices. As such, the application 700 may be configured to utilize AI inference engines configured using Large Language Models (LLMs), Generative AI (GenAI) models, and/or other AI models that would be apparent to one of skill in the art in possession of the present disclosure, and those AI inference engines/models may support the AI instruction set extensions (e.g. the AMXs) described above and may be "quantized" to support extension-supported formats (e.g., the "INT8" or "BF16" AMX supported formats) that configure the application 700 to use reduced-precision math during its operation in order to provide a relatively "lightweight" application that runs relatively quickly during the limited time needed to boot/initialize the computing device 200, and that is agnostic to operating system dependencies.

In a specific example, the application 700 may be provided by an AI computing device configuration application that provides for the configuration of the computing device 200, and may be configured to complete a BIOS Human Interface Infrastructure (HII) setup for the computing device 200 that is conventionally performed by a user using a BIOS Graphical User Interface (GUI). In another specific example, the application 700 may be provided by an AI computing device/workload optimization application that optimizes the computing device 200 to perform workloads. In yet another specific example, the application 700 may be provided by an AI diagnostic application that is configured to identify the source of reoccurring issues with the computing device 200. In yet another specific example, the application 700 may be provided by an AI analytics application that is configured to identify and securely store usage information for the computing device 200. In yet another specific example, the application 700 may be provided by an AI error handling application that is configured to handle errors that occur during initialization/boot of the computing device 200. However, while several specific examples are provided, one of skill in the art in possession of the present disclosure will appreciate how the boot applications described herein may be developed with any desired functionality while remaining within the scope of the present disclosure as well.

Figure 8A:
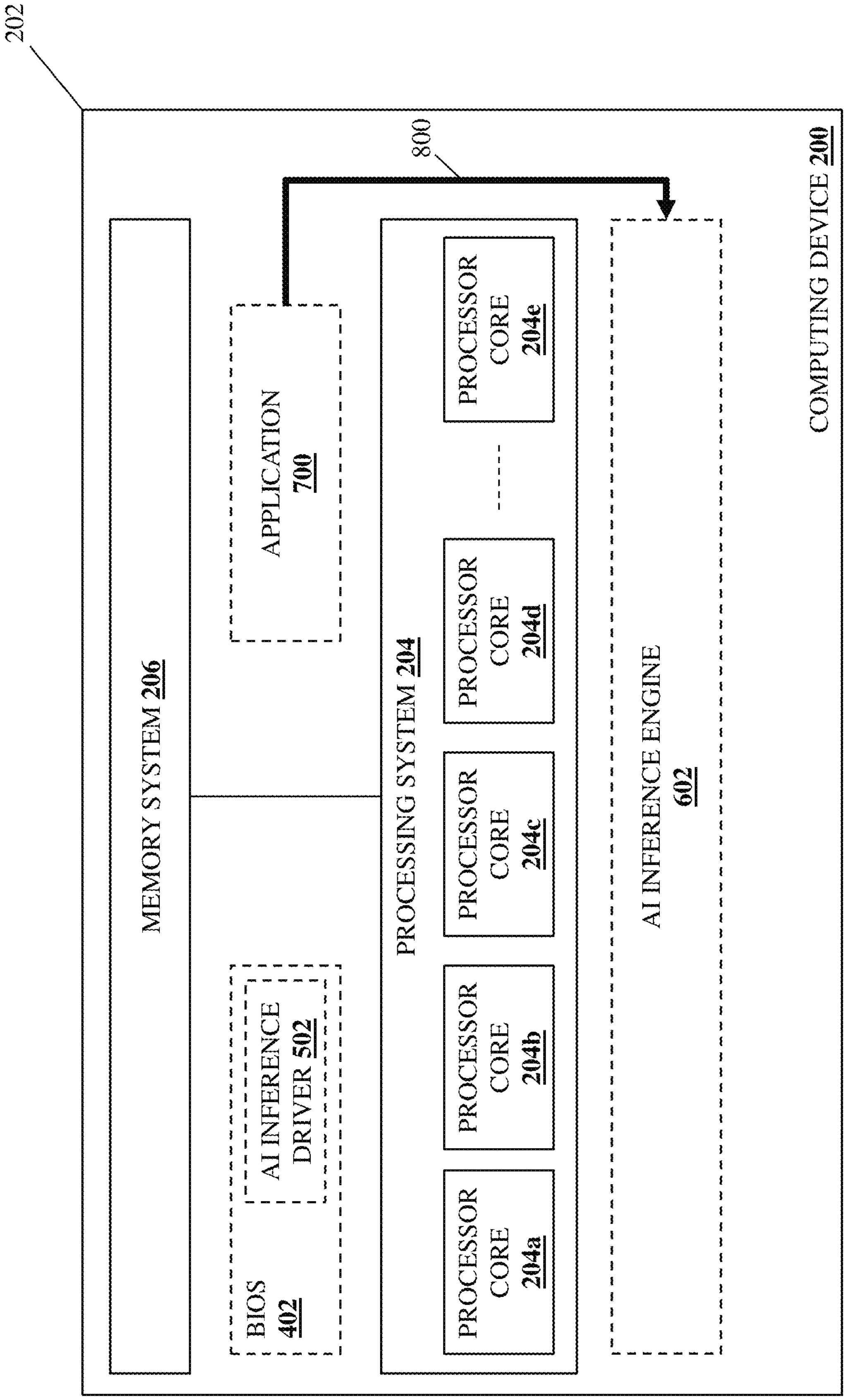
FIG. 8A is a schematic view illustrating an embodiment of the computing device of FIG. 2 operating during the method of FIG. 3.

If, at decision block 306, an AI inferencing request is received, the method 300 proceeds to block 308 where the BIOS performs the AI inferencing during the initialization of the computing device using the AI inferencing engine. With reference to FIG. 8A, in an embodiment of block 308, the application 700 may perform AI inferencing request provisioning operations 800 that may include using the AI inferencing protocol provided by the AI inferencing driver 502 discussed above to generate an AI inferencing request and transmit that inferencing request to the AI inference engine 602, which one of skill in the art in possession of the present disclosure will appreciate will result in the AI inference driver 502 in the BIOS 402 receiving that AI inferencing request. However, as described above, in other examples the application 700 may transmit the AI inferencing request to the BIOS 402 and, in response to the BIOS receiving the AI inferencing request, the AI inference driver 502 in the BIOS 402 may provide the AI inference engine 602.

In embodiments in which the application 700 is provided by the AI computing device configuration application described above, the AI inferencing request may be a configuration AI inferencing request to generate a configuration for the computing device 200. For example, a user may provide a natural language request to the AI computing device configuration application during the initialization/boot of the computing device 200 to provide a particular configuration for the computing device 200, and the AI computing device configuration application may generate the configuration AI inferencing request to utilize AI inferencing to generate configuration data that will provide that configuration for the computing device 200.

In embodiments in which the application 700 is provided by the AI computing device/workload optimization application described above, the AI inferencing request may be a performance testing AI inferencing request to test the performance of the computing device 200 in performing a workload using a plurality of different settings and identify one of the plurality of different settings for the computing device 200. For example, a user may provide a natural language request to the AI computing device configuration application during the initialization/boot of the computing device 200 to run performance tests for a workload that will be run on the computing device 200 using plurality of different computing device settings and identify one of the plurality of different settings that optimize the performance of the workload based on any of a variety of metrics (e.g. power usage metrics, workload performance time metrics, etc.), and the AI computing device configuration application may generate the performance testing AI inferencing request to utilize AI inferencing to perform that performance testing and identify those computing device settings.

In embodiments in which the application 700 is provided by the AI diagnostic application described above, the AI inferencing request may be a diagnostics AI inferencing request to identify a cause of an operating issue with the computing device 200. For example, for a computing device experiencing repeated operating issues (e.g., system “crashes”, system “hangs” etc.), a user contacting support services may be instructed to run the AI computing device configuration application during the initialization/boot of the computing device 200 to identify the cause (e.g., system settings, hardware, etc.) of those operating issues, and the AI computing device configuration application may generate the diagnostics AI inferencing request to utilize AI inferencing to identify the cause of those operating issues.

In embodiments in which the application 700 is provided by the AI analytics application described above, the AI inferencing request may be an analytics AI inferencing request to identify usage details for the computing device 200. For example, a user interested in how the computing device 200 is being used may run the AI analytics application during the initialization/boot of the computing device 200 to determine processing system usage, workload performance, and/or other computing device usage details known in the art, and the AI computing device configuration application may generate the analytics AI inferencing request to utilize AI inferencing to review system logs and/or other computing device prior-operating information to identify details of the use of the computing device 200. As will be appreciated by one of skill in the art in possession of the present disclosure, the performance of such analytics using the BIOS 402 may prevent the results of such analytics from being accessible to operating system that is provided on the computing device 200 subsequent to its initialization/boot, preventing those results from being sent to an outside party by the operating system, and providing relatively higher security for those analytics results.

In embodiments in which the application 700 is provided by the AI error handling application described above, the AI inferencing request may be an error handling AI inferencing request to handle an error that has occurred with the computing device 200 during its initialization/boot. For example, in the event the computing device 200 experiences an error during initialization/boot of the computing device 200, the AI error handling application may generate the error handling AI inferencing request to identify the error that has occurred with the computing device 200 during its initialization/boot, as well as a remedy to that error. However, while several specific examples have been provided one of skill in the art in possession of the present disclosure will appreciate how a variety of AI inference requests may be generated to perform AI inferencing for any of a variety of purposes while remaining within the scope of the present disclosure.

Figure 8B:
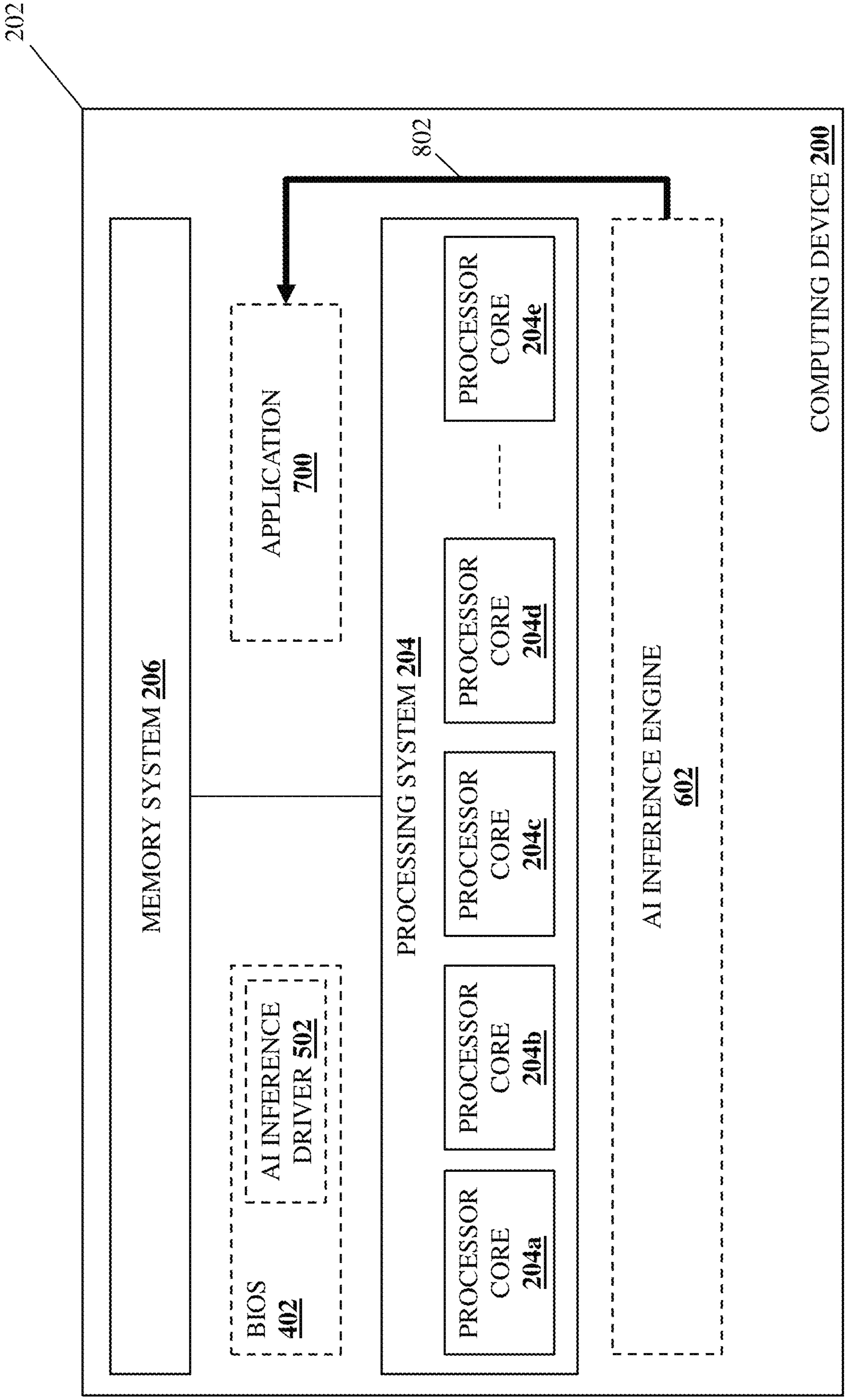
FIG. 8B is a schematic view illustrating an embodiment of the computing device of FIG. 2 operating during the method of FIG. 3.

With reference to FIG. 8B, in response to receiving the AI inferencing request, the inference engine 502 in the BIOS 402 may use the AI inference engine 602 to perform the requested AI inferencing using the plurality of processor cores 204*a*-204*e* operating in parallel (e.g., via the AI inference engine provisioning operations 600 illustrated in FIG. 6) in order to produce an AI inferencing result, and may perform AI inferencing result provisioning operations 802 that include transmitting that AI inferencing result to the application 700. As will be appreciated by one of skill in the art in possession of the present disclosure, the AI inference engine 602 may use any of the AI instruction set extensions enabled by the inference drive 502 in the BIOS 402 as described above in order to perform the AI inferencing. Furthermore, one of skill in the art in possession of the present disclosure will appreciate that while CPUs are relatively slower in performing AI inferencing and generally result in relatively more latency than GPUs, such latency is reduced in the boot AI inferencing system of the present disclosure by performing that AI inferencing using all of the available processor cores 204*a*-204*e* and the AI instruction set extensions as described above.

In embodiments in which the AI inferencing request was a configuration AI inferencing request to generate a configuration for the computing device 200, the AI inferencing performed by the processor cores 204*a*-204*e* operating in parallel may generate configuration data that will provide a requested configuration for the computing device 200. As such, in response to receiving that configuration data as part of the AI inferencing result, the application 700 may use that configuration data to configure the computing device 200.

In embodiments in which the AI inferencing request was a performance testing AI inferencing request to test the performance of the computing device 200 in performing a workload using a plurality of different settings and identify one of the plurality of different settings for the computing device 200, the AI inferencing performed by the processor cores 204*a*-204*e* operating in parallel may identify those computing device settings. As such, in response to receiving those computing device settings as part of the AI inferencing result, the application 700 may use those computing device settings with the computing device 200 to perform the workload.

In embodiments in which the AI inferencing request was a diagnostics AI inferencing request to identify a cause of an operating issue with the computing device 200, the AI inferencing performed by the processor cores 204*a*-204*e* operating in parallel may identify the cause of those operating issues. As such, in response to receiving the cause of those operating issues as part of the AI inferencing result, the application 700 may display that cause of those operating issues to the user, may transmit the cause of those operating issues to the support service, and/or any may perform other operation issue trouble shooting techniques that would be apparent to one of skill in the art in possession of the present disclosure.

In embodiments in which the AI inferencing request was an analytics AI inferencing request to identify usage details for the computing device 200, the AI inferencing performed by the processor cores 204*a*-204*e* operating in parallel may review system logs and/or other computing device prior-operating information to identify details of the use of the computing device 200. As such, in response to receiving the identification of those details of the use of the computing device 200 as part of the AI inferencing result, the application 700 may display the identification of those details to the user.

In embodiments in which the AI inferencing request was an error handling AI inferencing request to handle an error that has occurred with the computing device 200 during its initialization/boot, the AI inferencing performed by the processor cores 204*a*-204*e* operating in parallel may identify the error that has occurred with the computing device 200 during its initialization/boot, as well as a remedy to that error. As such, in response to receiving the identification of the error that has occurred with the computing device 200 during its initialization/boot, as well as a remedy to that error, the application 700 may apply that remedy to correct (or otherwise "handle") the error that occurred with the computing device 200 during its initialization/boot. As will be appreciated by one of skill in the art in possession of the present disclosure, the example of the AI error handling application described above provides an example of a BIOS-embedded application that may be integrated into the initialization/boot flow for the computing device 200 and "hidden" from the user (i.e. the user need not be informed of the error or error handling described above). However, while several specific examples have been provided, one of skill in the art in possession of the present disclosure will appreciate how a variety of AI inferencing may be performed by the processor cores 204*a*-204*e* operating in parallel for any of a variety of purposes while remaining within the scope of the present disclosure.

If at decision block 306 no AI inferencing request is received, or following block 308, the method 300 proceeds to decision block 310 where the method 300 proceeds depending on whether the initialization of the computing device is completed. In an embodiment, the AI inference engine 602 may be provided throughout the initialization/boot of the computing device 200 (e.g., at the end of and/or following the DXE phase of the initialization/boot of the computing device 200, and throughout the BDS phase the initialization/boot of the computing device 200), and the BIOS 402 may be configured to cease providing the AI inference engine 602 once the initialization/boot of the computing device 200 completes (e.g. once the BDS phase of the initialization/boot of the computing device 200 completes and the BIOS enter the RT phase described above). However, one of skill in the art in possession of the present disclosure will appreciate how the continued provisioning of the AI inference engine 602 by the AI inference driver 502 in the BIOS 402 during the RT phase is possible and will fall within the scope of the present disclosure.

If, at decision block 310, the initialization of the computing device has not completed, the method 300 returns to decision block 306. As such, the method 300 may loop such that the AI inference engine 602 may be utilized to perform the AI inferencing described above as requested by any boot applications as long as the computing device 200 is initializing/booting. If, at decision block 310, the initialization of the computing device is completed, the method 300 proceeds to block 312 where the computing device enters runtime. In an embodiment, at decision block 310, the initialization/boot of the computing device 200 may complete (e.g. the BDS phase of the initialization/boot of the computing device 200 may complete) and at block 312 the computing device 200 may enter runtime (e.g., an operating system may take control of the computing device 200 and the BIOS 402 may enter the RT phase described above).

Thus, systems and methods have been described that operate a plurality of processor cores in a processing system of a computing devices in parallel to provide an AI inferencing engine during boot of the computing device, and enable AI instruction set extension(s) during boot of the computing device for use by the AI inferencing engine. For example, the boot AI inferencing system may include a computing device. A processing system in the computing device includes a plurality of processor cores. A first processor core in the plurality of processor cores provides a Basic Input/Output System (BIOS) that, during initialization of the computing device, uses the plurality of processor cores operating in parallel to provide an Artificial Intelligence (AI) inference engine, and enables at least one AI instruction set extension for use by the AI inference engine. When the BIOS receives an AI inferencing request from an application to perform AI inferencing, it uses the AI inference engine to perform the AI inferencing request. As discussed above, such AI inferencing may be utilized by UEFI shell applications, BIOS-embedded applications, and/or other boot applications that perform configuration, device/workload optimization, diagnostics, error handling, and/or other functionality during the boot of the computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A boot Artificial Intelligence (AI) inferencing system, comprising:
- a computing device;
- a processing system that is included in the computing device and that includes a plurality of processor cores; and
- a first processor core that is included in the plurality of processor cores and that is configured to provide a Basic Input/Output System (BIOS) that is configured, during initialization of the computing device, to:
  - provide, using the plurality of processor cores operating in parallel to execute Artificial Intelligence (AI) inference instructions, an Artificial Intelligence (AI) inference engine;
  - enable at least one AI instruction set extension in the plurality of processor cores operating in parallel for use by the AI inference engine in performing AI inference operations, wherein the at least one AI instruction set extension includes a set of processor-core-executable instructions that are configured to optimize execution of the AI inference operations by the plurality of processor cores;
  - receive, from an application, an AI inferencing request to perform first AI inference operations; and
  - perform, using the AI inference engine and the at least one AI instruction set extension, the first AI inference operations according to the AI inferencing request.

2. The system of claim 1, wherein the application is a BIOS-embedded application that is integrated in the BIOS.

3. The system of claim 1, wherein the application is a Unified Extensible Firmware Interface (UEFI) shell application.

4. The system of claim 1, wherein the AI inferencing engine is provided during a Boot Device Selection (BDS) phase of the initialization of the computing device and following a Driver eXecution Environment (DXE) phase of the initialization of the computing device.

5. The system of claim 1, wherein the first processor core is a Boot Strap Processor (BSP) core, and wherein the plurality of processor cores include a plurality of Application processor (AP) cores.

6. The system of claim 1, wherein the enabling the at least one AI instruction set extension in the plurality of processor cores operating in parallel for use by the AI inference engine in performing AI inference operations includes enabling a respective accelerator included in each of the plurality of processor cores.

7. An Information Handling System (IHS), comprising:
- a processing system including a plurality of processor cores; and
- a memory system that is coupled to the processing system and that includes instructions that, when executed by a first processor core in the plurality of processor cores included in the processing system, cause the first processor core to provide a Basic Input/Output System (BIOS) that is configured, during initialization of the IHS, to:
  - provide, using the plurality of processor cores operating in parallel to execute Artificial Intelligence (AI) inference instructions, an Artificial Intelligence (AI) inference engine;
  - enable at least one AI instruction set extension in the plurality of processor cores operating in parallel for use by the AI inference engine in performing AI inference operations, wherein the at least one AI instruction set extension includes a set of processor-core-executable instructions that are configured to optimize execution of the AI inference operations by the plurality of processor cores;
  - receive, from an application, an AI inferencing request to perform first AI inference operations; and
  - perform, using the AI inference engine and the at least one AI instruction set extension, the first AI inference operations according to the AI inferencing request.

8. The IHS of claim 7, wherein the application is a BIOS-embedded application that is integrated in the BIOS.

9. The IHS of claim 7, wherein the application is a Unified Extensible Firmware Interface (UEFI) shell application.

10. The IHS of claim 7, wherein the AI inferencing engine is provided during a Boot Device Selection (BDS) phase of the initialization of the IHS and following a Driver eXecution Environment (DXE) phase of the initialization of the IHS.

11. The IHS of claim 7, wherein the first processor core is a Boot Strap Processor (BSP) core, and wherein the plurality of processor cores include a plurality of Application processor (AP) cores.

12. The IHS of claim 7, wherein the enabling the at least one AI instruction set extension in the plurality of processor cores operating in parallel for use by the AI inference engine in performing AI inference operations includes enabling a respective accelerator included in each of the plurality of processor cores.

13. The IHS of claim 7, wherein the AI inferencing request includes one of:
- a configuration AI inferencing request to generate a configuration for the IHS;
- a performance testing AI inferencing request to test the performance of the IHS in performing a workload using a plurality of different settings and identify one of the plurality of different settings for the IHS;
- a diagnostics AI inferencing request to identify a cause of an operating issue with the IHS;
- an analytics AI inferencing request to identify usage details for the IHS; or
- an error handling AI inferencing request to handle an error that has occurred with the IHS.

14. A method for performing Artificial Intelligence (AI) inferencing during boot of a computing device, comprising:
- providing, by a first processor core included in a plurality of processor cores in a processing system of a computing device during initialization of the computing device, a Basic Input/Output System (BIOS);
- providing, by the BIOS during the initialization of the computing device using the plurality of processor cores operating in parallel to execute Artificial Intelligence (AI) inference instructions, an Artificial Intelligence (AI) inference engine;
- enabling, by the BIOS during the initialization of the computing device, at least one AI instruction set extension in the plurality of processor cores operating in parallel for use by the AI inference engine in performing AI inference operations, wherein the at least one AI instruction set extension includes a set of processor-core-executable instructions that are configured to optimize execution of the AI inference operations by the plurality of processor cores;
- receiving, by the BIOS during the initialization of the computing device from an application, an AI inferencing request to perform first AI inference operations; and performing, by the BIOS during the initialization of the computing device using the AI inference engine and the at least one AI instruction set extension, the first AI inference operations according to the AI inferencing request.

15. The method of claim 14, wherein the application is a BIOS-embedded application that is integrated in the BIOS.

16. The method of claim 14, wherein the application is a Unified Extensible Firmware Interface (UEFI) shell application.

17. The method of claim 14, wherein the AI inferencing engine is provided during a Boot Device Selection (BDS) phase of the initialization of the IHS and following a Driver eXecution Environment (DXE) phase of the initialization of the IHS.

18. The method of claim 14, wherein the first processor core is a Boot Strap Processor (BSP) core, and wherein the plurality of processor cores include a plurality of Application processor (AP) cores.

19. The method of claim 14, wherein the enabling the at least one AI instruction set extension in the plurality of processor cores operating in parallel for use by the AI inference engine in performing AI inference operations includes enabling a respective accelerator included in each of the plurality of processor cores.

20. The method of claim 14, wherein the AI inferencing request includes one of:

a configuration AI inferencing request to generate a configuration for the IHS;

a performance testing AI inferencing request to test the performance of the IHS in performing a workload using a plurality of different settings and identify one of the plurality of different settings for the IHS;

a diagnostics AI inferencing request to identify a cause of an operating issue with the IHS;

an analytics AI inferencing request to identify usage details for the IHS; or an error handling AI inferencing request to handle an error that has occurred with the IHS.

* * * * *